United States Patent [19]

Hluchyj et al.

[11] Patent Number: 5,425,029
[45] Date of Patent: Jun. 13, 1995

[54] FAST PACKET ADAPTATION METHOD FOR ENSURING PACKET PORTABILITY ACROSS DIVERSIFIED SWITCHING TYPE NETWORKS

[75] Inventors: Michael G. Hluchyj, Wellesley; Steven R. Cook, Franklin; Hassan Ahmed, Westwood, all of Mass.

[73] Assignee: Motorola, Inc., Schaumburg, Ill.

[21] Appl. No.: 123,776

[22] Filed: Sep. 20, 1993

[51] Int. Cl.$^6$ .............................. H04J 3/24
[52] U.S. Cl. ................. 370/94.1; 370/85.13; 370/94.2
[58] Field of Search ......... 370/94.1, 99, 85.7, 370/85.13, 110.1, 54, 102, 85.6, 85.14

[56] References Cited

U.S. PATENT DOCUMENTS

| Re. 33,426 | 11/1990 | Sugimoto et al. | 370/85.13 |
| 5,060,140 | 10/1991 | Brown et al. | 364/200 |
| 5,119,370 | 6/1992 | Terry | 370/110.1 |
| 5,166,926 | 11/1992 | Cisnevda et al. | 370/94.1 |
| 5,224,099 | 6/1993 | Corbalis et al. | 370/94.2 |
| 5,251,207 | 10/1993 | Abensour et al. | 370/99 |
| 5,291,485 | 3/1994 | Afify et al. | 370/99 |

OTHER PUBLICATIONS

S. E. Minzer, "Broadband ISDN and Asynchronous Transfer Mode (ATM)," IEEE Communications Magazine, pp. 17–24, Sep. 1989.

Primary Examiner—Douglas W. Olms
Assistant Examiner—Shick Hom
Attorney, Agent, or Firm—Darleen J. Stockley

[57] ABSTRACT

The present invention provides for fast packet information transfer from a first type switching system to a diverse, i.e., different, type switching system by adaptation of a format of each fast packet from the first type switching system to a format that is portable across the second type switching system. For example, the present invention enables transport of fast packets from a fast packet switching system across a cell relay system and vice versa, from a fast packet switching system across an asynchronous transfer mode system and vice versa, and so on.

28 Claims, 5 Drawing Sheets

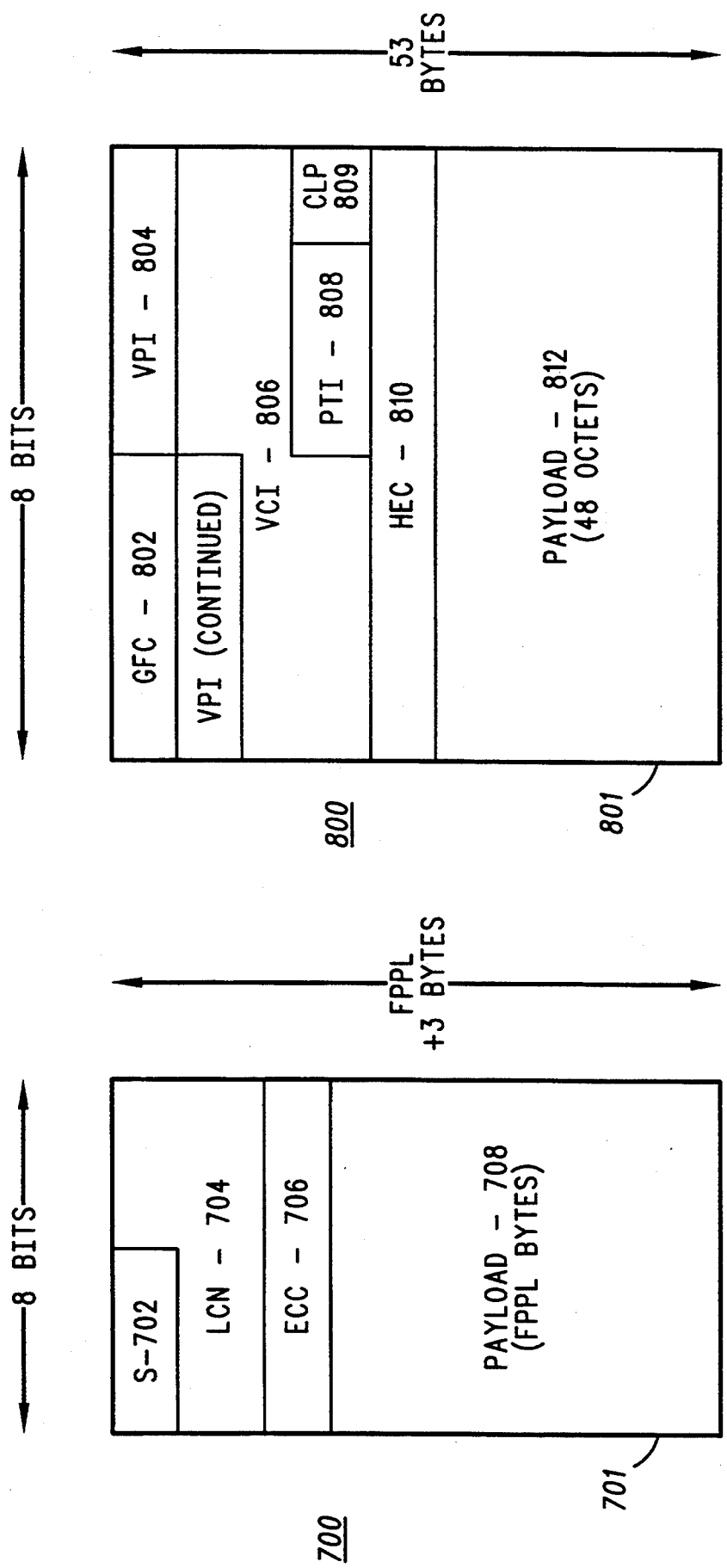

FAST PACKET ADAPTATION METHOD FOR ENSURING PACKET PORTABILITY ACROSS DIVERSIFIED SWITCHING TYPE NETWORKS

FIELD OF THE INVENTION

This invention is generally directed to fast packet transport and more particularly to diversified internetworking of fast packet and cell relay networks.

BACKGROUND OF THE INVENTION

Fast packet technology provides efficiency and resilience for transfer of information for networks containing a diversity of traffic types such as voice, constant bit rate (CBR), video, and multiple types of data traffic from diverse applications. Present communication systems rely on a particular network switching type to transport specific traffic types. For example, circuit switching is most appropriate for voice and other constant bit rate traffic sources. Frame switch technologies (X.25 and frame relay) are most appropriate for bursty data traffic (wide area LAN inter-connect and transaction based applications), but are not appropriate for video or voice traffic.

The spectrum of the more well known switching technologies, listed progressively for fixed bit rate and simplicity to variable bit rate and complexity, are: circuit switching (CS), multirate circuit switching, fast circuit switching, cell relay (CR), fast packet switching (FP), and frame relay (FR) (frame switching).

FP and CR networking technologies are very similar in nature and solve many of the same networking problems. Both allow the construction of efficient and cost effective networks that carry diverse traffic types such as voice, video, CBR, and bursty data traffic. The major common element of FP and CR networks is that both convert (adapt) various types of traffic to a common format before transporting the traffic across the network. In both cases, the common form is a "small packet", where small is typically 64 or less octets. Each packet contains a network header containing destination or logical address, congestion level information, priority information, etc., and a payload portion containing the user's data. The main difference between a FP and CR network is that the size of the packet in a CR network is a fixed length, and the size of a packet in a FP network is variable in length.

The efficiency and diversity of CR and FP networks is obtained by the adaption of the traffic source, at the edge of the network, i.e., where the network begins/ends, to a common form or packet. This allows network switches to handle the traffic in a common way inside each type of network independent of the source type. Note that at the edges of the network, different traffic types need to be adapted to the common form, or packets. These adaption procedures are traffic source type dependent. For example, CCITT AAL1 protocol is used for adaption of CBR traffic to ATM (asynchronous transfer mode) cells, and CCITT AAL5 protocol is used for adaption of HDLC framed traffic to ATM cells.

CR and FP networks both allow for efficient networks that carry diverse types of traffic. However, there has been no efficient means of inter-networking between CR and FP networks. The main hindrance is that the adaption procedures used by FP and CR networking technologies are similar, but different. Therefore, the only method of inter-networking has been to adapt the packets of one type packet to the original form, and then adapt the original form to the other packet type. This level of processing at inter-networking points is costly and adds unacceptable transmission delay to the traffic.

As users and devices communicate with one another there develops a need to communicate also across information networking systems that use different types. Thus, there is a need for a fast packet adaptation method that ensures packet portability across diverse switching type networks.

BRIEF DESCRIPTION OF THE DRAWINGS

FIG. 7 illustrates exemplary fields for the fast packet format for the preferred embodiment, which is representative of fast packet formats in general.

FIG. 8 illustrates a packet format for an ATM cell as specified by CCITT recommendation I.361.

DESCRIPTION OF THE PREFERRED EMBODIMENT

Fast packet and cell relay communication networks presently convey information (from various traffic types) from one system to a second system of a same switching type. This is done by performing traffic type specific adaption protocols which convert specific traffic types to packets, and vice versa, at edge networking nodes, and then transporting the packets across the network via packet switches of the same type.

Figure 1:
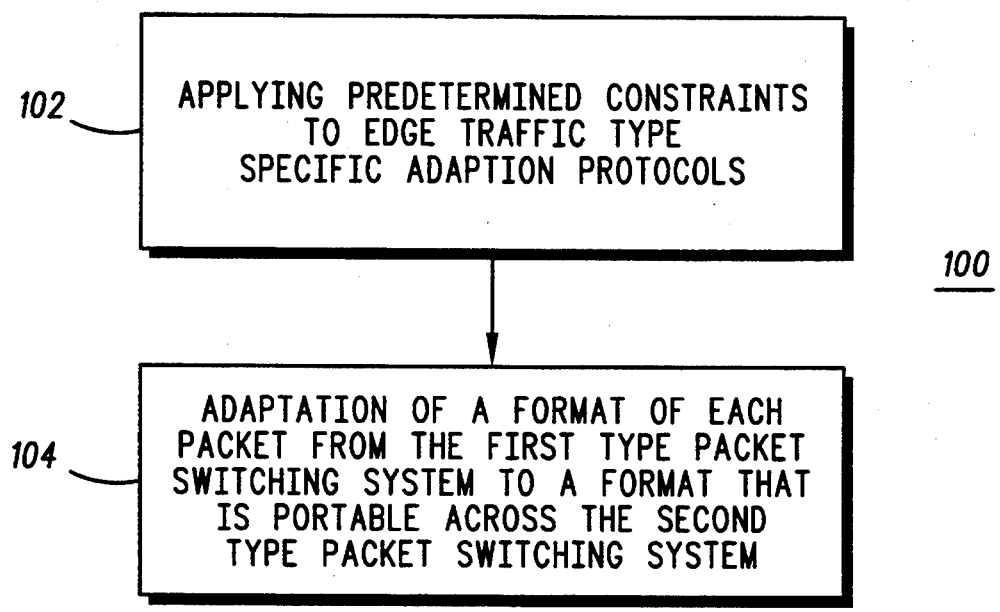
FIG. 1 is a flow chart showing steps taken in accordance with the method of the present invention in a connection-oriented packet communication network system having inter-networking switching node(s).

FIG. 1, numeral 100, is a flow chart showing steps taken in accordance with the method of the present invention in a connection-oriented packet communication network system having inter-networking switching node(s). The method of the present invention allows packet information transfer from a first type packet switching system to a different second type packet switching system by (a) applying predetermined constraints to the edge traffic type specific adaption protocols (102), and (b) adaptation of a format of each packet from the first type packet switching system to a format that is portable across the second type packet switching system (104). For example, the present invention allows variable length fast packets from a fast packet switching system to be transported across a fixed length cell relay system and vice versa, from a fast packet switching system across an asynchronous transfer mode system and vice versa, from a cell relay switching system to be transported across a fast packet switch system, and so on.

Figure 2:
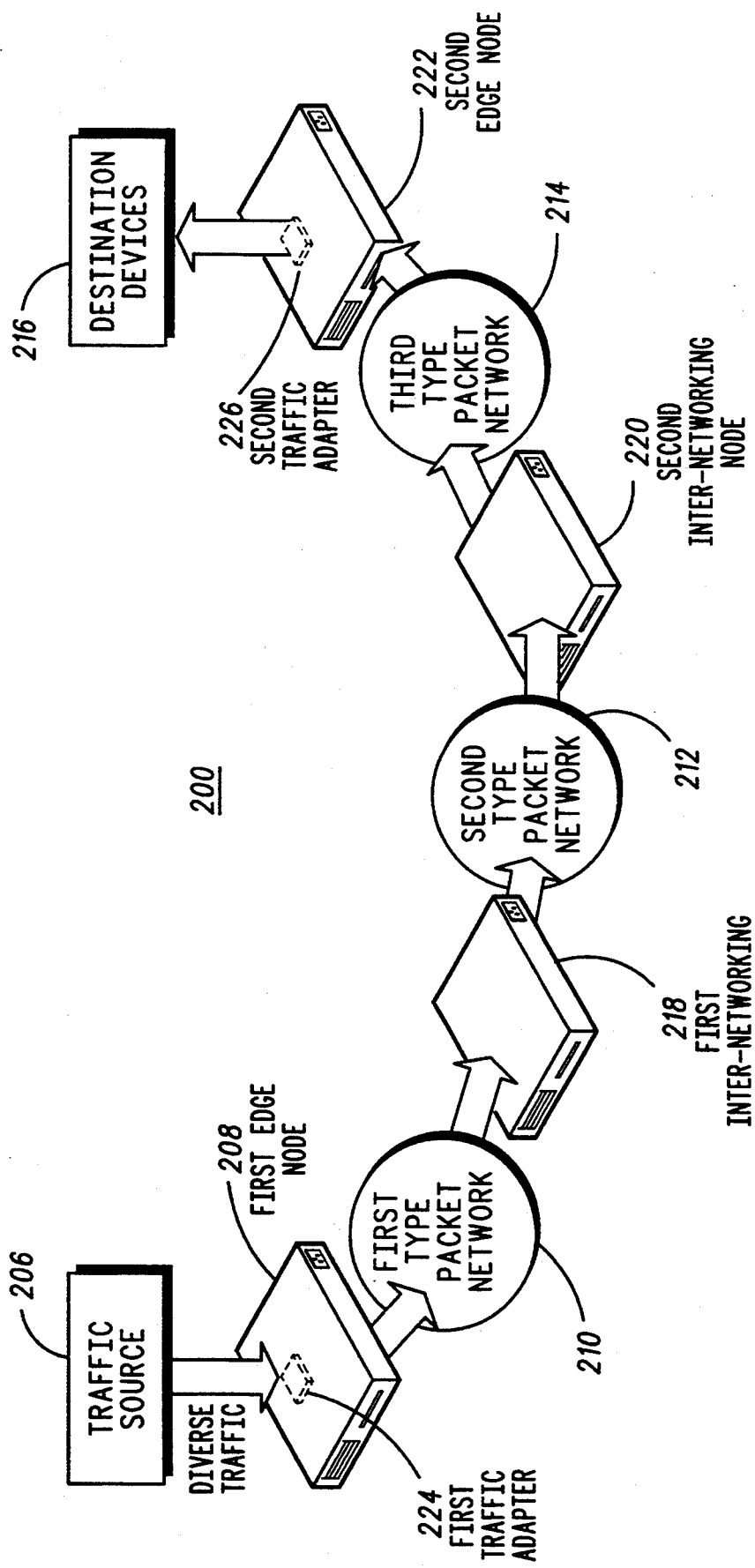
FIG. 2 is a diagram of a first embodiment of a connection-oriented communication network system in accordance with the present invention.

FIG. 2, numeral 200, is a diagram of a first embodiment of a connection-oriented communication network system in accordance with the present invention. A traffic source (206) is a source of diverse traffic (voice, data, CBR (constant bit rate), video, ...) that is operably coupled to a first networking edge node (208) of a first type packet network (210). The first edge node (208) includes a traffic adapter (224) for applying preselected constraints to edge traffic type specific adaption protocols. The first type packet network (210) is operably coupled by a first inter-networking node (218) to at least a first second type packet network (212). The second type packet network (212) is operably coupled to a third type packet network (214) by a second inter-networking node (220). The second edge node (222) includes a second traffic adapter (226) for reversing application of the preselected constraints to edge traffic type specific adaption protocols. The third type packet network (214) may be selected to be the same network as the first type packet network (210). The third type packet network (214) is operably coupled to destination device(s) (216) by a second edge node (222).

The traffic source (206) provides traffic to the first type packet network (210), and the first edge node (208) utilizes the first traffic adapter (224) to perform predetermined traffic type specific adaption protocols to convert various traffic types to first type packets compatible with first type packet network (210). Then, the first type packet network (210) transports the first type packets sequentially to the first inter-networking node (218) that operably couples the first type packet network (210) to the second type packet network (212). The first inter-networking node (218) adapts the first type packets to second type packets compatible with second type packet network (212). The second type network (212) transports the second type packets sequentially to the second inter-networking node (220) that operably couples the second type packet network (212) to the third type packet network (214), which may be selected to the the same type network as the first type packet network (210). The second inter-networking node (220) converts the second type packets from the second type network (212) to third type packets compatible with third type packet network (214). The third type packet network (214) transports the third type packets to the second edge node (222). Then, the second edge node (222) utilizes the second traffic adapter (226) to perform predetermined traffic type specific adaption protocols to convert the third type packets to the various traffic specific types and delivers traffic to destination device(s) (216). Not shown, is a possible reverse path from destination device(s) (216) to the traffic source (206), but which is a obvious extension of the above.

Figure 3:
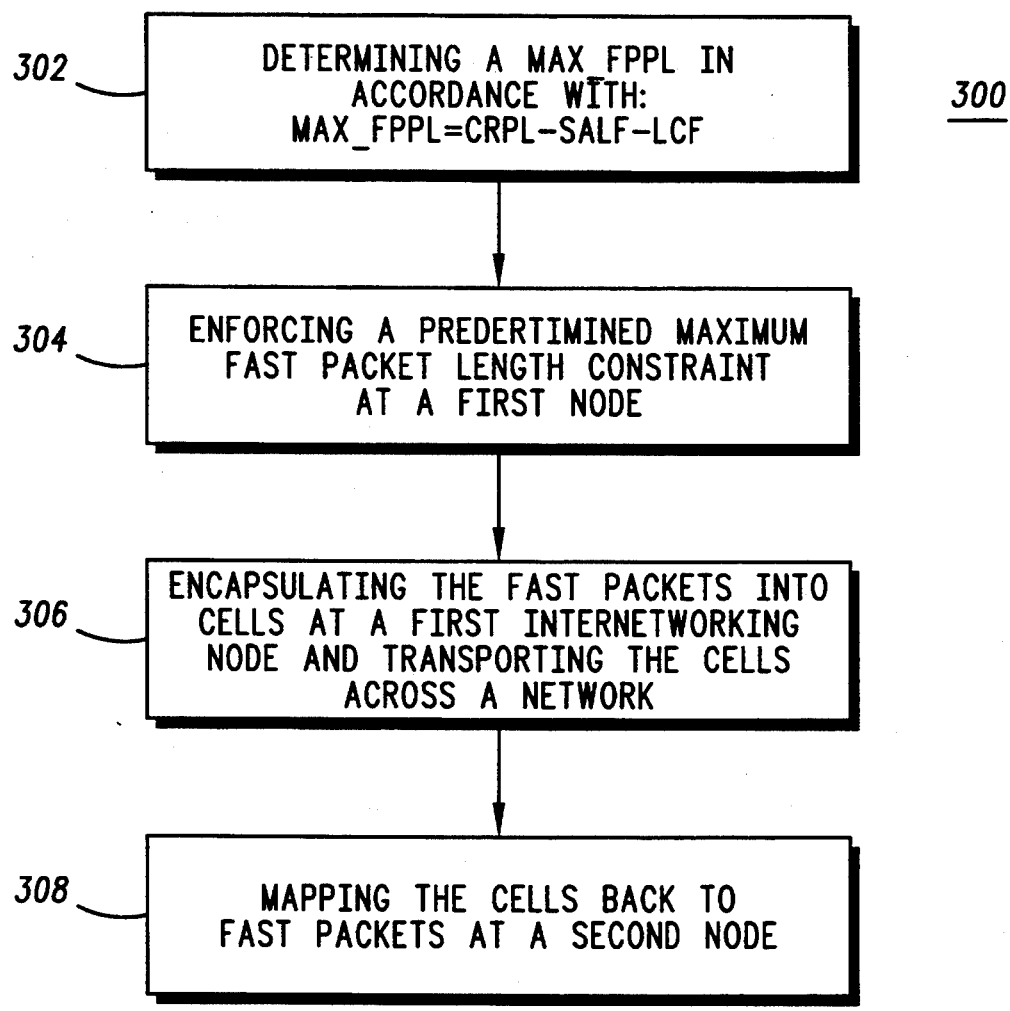
FIG. 3, numeral 300, is a flow chart of the steps of a second embodiment in accordance with the method of the present invention.

FIG. 3, numeral 300, is a flow chart of the steps of a second embodiment in accordance with the method of the present invention. The method provides for adaption of variable length fast packets such that portability of fast packet information is ensured across a cell relay network. The method assures that the adaption (typically at internetworking nodes) is simple, i.e., is one-to-one, and traffic type independent. The method comprises the steps of: (A) determining a maximum allowable FP payload length (MAX_FPPL) (302) in accordance with the function: MAX_FPPL =CRPL-SALF-LCF, where CRPL represents cell relay payload length in network, SALF represents storage area required for a length field to store the fast packet payload length, and LCF represents a length of any additional control fields, (B) enforcing a maximum fast packet length constraint (304) at a first node (for example, a fast packet traffic source edge node) where the traffic type specific adaption protocol is constrained to limit resulting fast packet payload sizes to MAX_FPPL, (C) encapsulating the fast packets into cells at a first inter-networking node (306) (that may also be the first node), and transporting the cells across a network, and (D) mapping the cells back to fast packets at a second node (308) (for example, an edge node).

Step (A) above insures that fast packet to cell mapping is one-to-one and that no segmentation or re-assembly is required.

Figure 4:
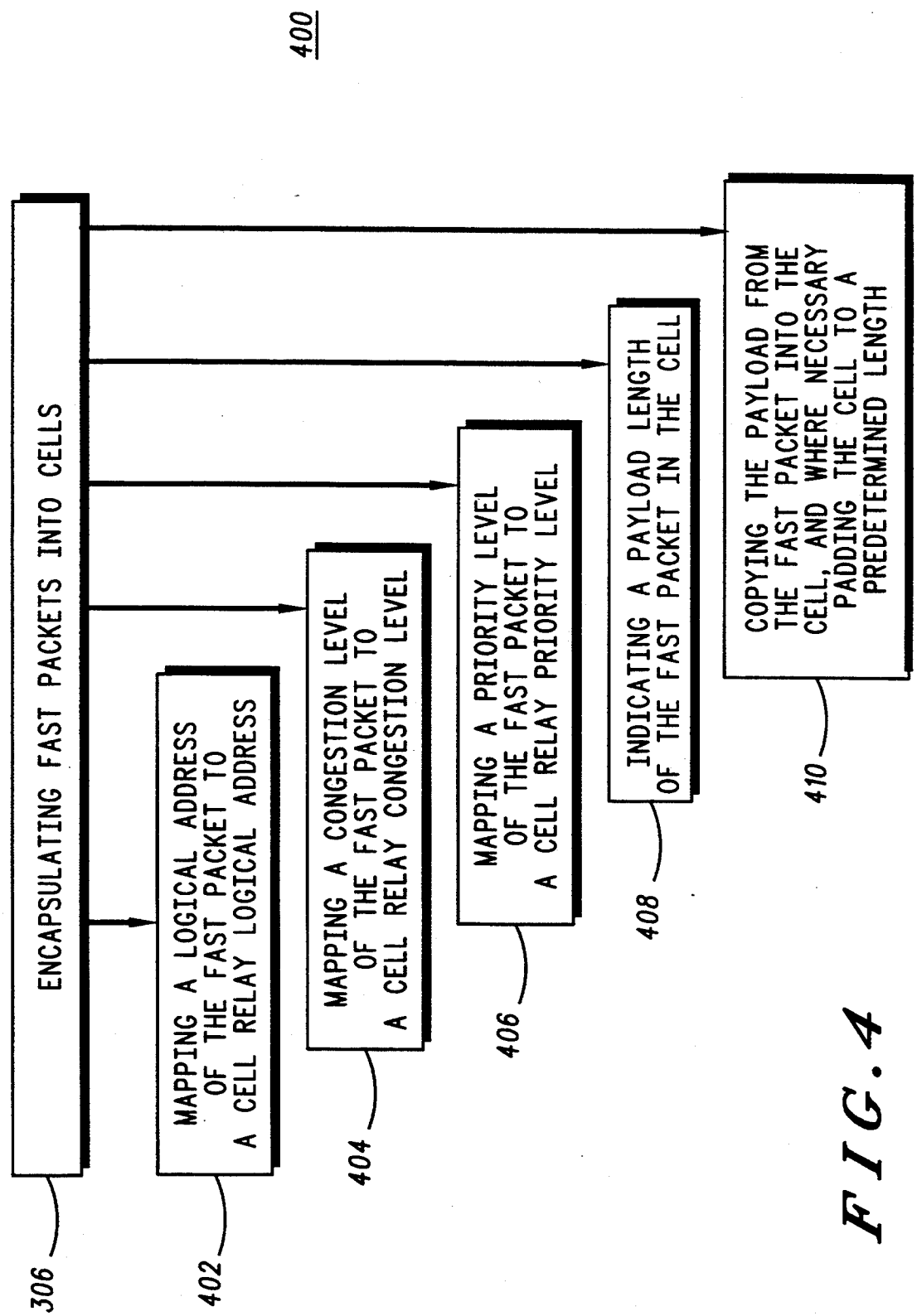
FIG. 4 shows selected further steps for encapsulating the fast packets into cells of FIG. 3.

Typically, as shown in FIG. 4, numeral 400, encapsulating the fast packets into cells includes at least one of the following: mapping a logical address of the fast packet to a cell relay logical address (402), mapping a congestion level of the fast packet to a cell relay congestion level (404), mapping a priority level of the fast packet to a cell relay priority level (406), indicating a payload length of the fast packet in the cell (408), and copying the payload from the fast packet into the cell, and, where necessary, padding the cell to a predetermined length (410). Where the logical address of the fast packet is mapped to a cell relay logical address, a predetermined (where selected, multi-stage) table look-up procedure is typically used. Where a congestion level of the fast packet is mapped to a cell relay congestion level, and vice versa, and where a discard priority level of a fast packet is mapped discard priority level of a cell, and vice versa, the mapping may not be one to one and would typically require a boolean function to define suitable mappings between congestion and priority levels of the differing type networks.

Since variable length fast packet networks are optimized for networks with lower speed inter nodal links (56 Kbs to 2 Mbs), and cell relay networks are optimized for networks with high speed inter nodal links, it is not uncommon for fast packet networks to include more congestion and/or priority levels than cell relay networks. When this is the case, the multiple congestion and priority levels of the fast packet can be (also) mapped into a control field in the payload portion of the cell at an inter-networking node. In this case, the mapping of cells to fast packets at inter networking point would extract fast packet priority and congest information from the control field, combine through boolean function with cell congestion and priority information to derive new appropriate fast packet congestion and priority level information for fast packet network. Where the payload from the fast packet is copied into the cell, padding may be zero padding, or alternatively multiple code words, for example, the code word 01101010, binary, repeated. In addition, network control information may be mapped from the header of the fast packet into the payload of cell relay packet.

Figure 5:
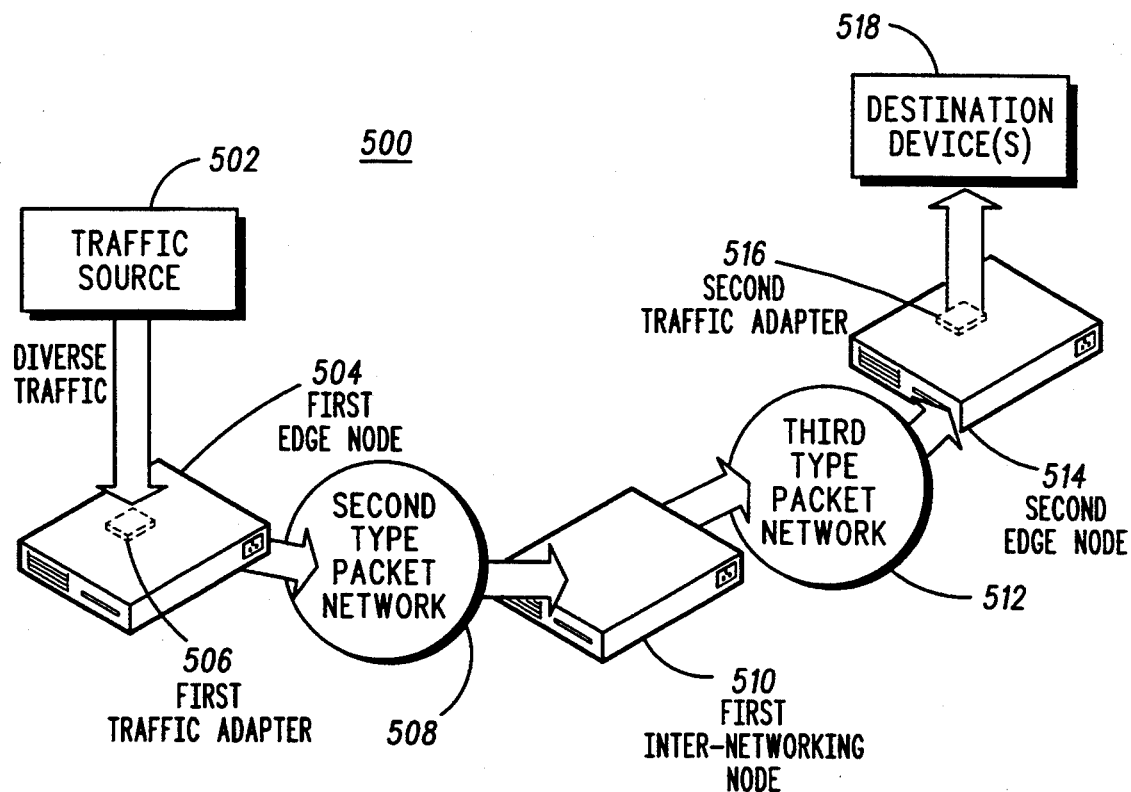
FIG. 5 is a diagram of a second embodiment of a connection-oriented communication network system in accordance with the present invention.

FIG. 5, numeral 500, is a diagram of a second embodiment of a connection-oriented communication network system in accordance with the present invention. The system ensures portability of packet traffic from a first switching type network to a second switching type network and includes: A) traffic source(s) (502), for providing diverse traffic (e.g., voice, data, CBR (constant bit rate), video, ...) to a first edge node of the first switching type packet network, B) the first edge node (504), having a first traffic adapter (506) for performing predetermined traffic type specific adaption protocols to convert various traffic types from the traffic sources to first type packets compatible with a first type packet network, where the packets are also convertible one-to-one to second type packets that are compatible with the second type packet network, C) the first edge node (504) converting the first type packets to second type packets that are compatible with the second type packet network, D) the second type packet network (508), operably coupled to the first edge node (504), for transporting second type packets sequentially to at least a first inter-networking node (510), E) the first inter-networking node (510), operably coupled to the second type packet network, for operably coupling the second type packet network (508) to at least a third type packet network (512) and converting the second type packets to third type packets that are compatible with the third type packet network (512), F) the third type packet network (512), operably coupled to the first inter-networking node (510), for transporting third type packets sequentially to at least a second edge node (514), G) the second edge node (514), operably coupled to the third type packet network (512), having a second traffic adapter (516) for performing predetermined traffic% type specific adaption protocols to convert the third type packets to the diverse traffic types that are compatible with destination source(s), and H) destination source(s) (518), operably coupled to the second edge node, for receiving the traffic.

Again, the third: type packet network (512) may be selected to be a packet network of the first type such that, also, the third type of packets are selected to be packets of the first type.

Figure 6:
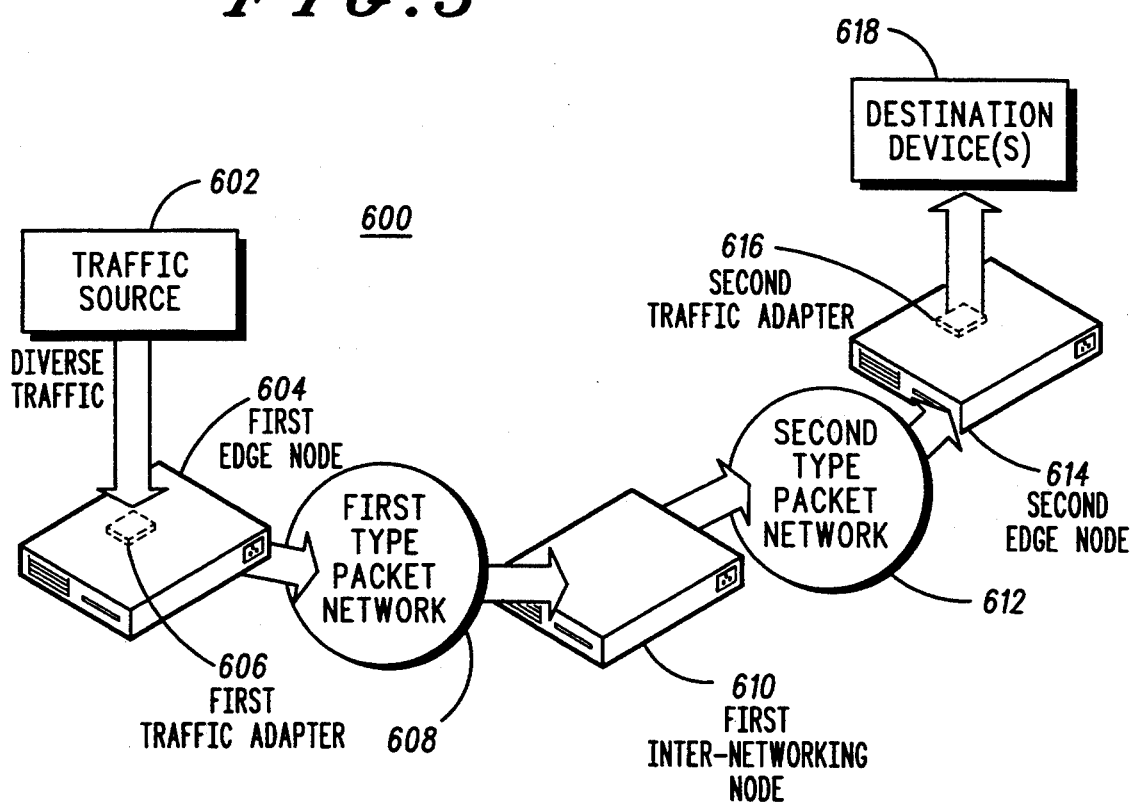
FIG. 6 is a diagram of a third embodiment of a connection-oriented communication network system in accordance with the present invention.

FIG. 6, numeral 600, is a diagram of a third embodiment of a connection-oriented communication network system in accordance with the present invention. The system ensures portability of packet traffic from a first switching type network to a second switching type network and includes: A) traffic source(s) (602), for providing diverse traffic (e.g., voice, data, CBR (constant bit rate), video, . . . ) to a first edge node of the first switching type packet network, B) the first edge node (604), having a first traffic adapter (606) for performing predetermined traffic type specific adaption protocols to convert various traffic types from the traffic sources to first type packets compatible with a first type packet network, where the packets are also convertible one-to-one to second type packets that are compatible with a second type packet network, C) the first type packet network (608), operably coupled to the first edge node (604), for transporting first type packets sequentially to at least a first inter-networking node (610), D) the first inter-networking node (610), operably coupled to the first type packet network, for operably coupling the first type packet network (608) to at least a second type packet network (612) and converting the first type packets to second type packets that are compatible with the second type packet network (612), E) the second type packet network (612), operably coupled to the first inter-networking node (610), for transporting second type packets sequentially to at least a second edge node (614), F) the second edge node (614), operably coupled to the second type packet network (612) converts the second type packets to third type packets that are compatible with a third type packet network, G) the second edge node (614) having a second traffic adapter (616) for performing predetermined traffic type specific adaption protocols to convert the third type packets to the diverse traffic types that are compatible with destination source(s), and H) destination source(s) (618), operably coupled to the second edge node, for receiving the traffic.

Again, the third type packet network may be selected to be a packet network of the first type (608) such that, also, the third type of packets are selected to be packets of the first type.

Alternatively, the connection-oriented communication network system for ensuring portability of packet traffic from a first switching type network to a second switching type network, may be described as follows. The system comprises: A) traffic source(s), for providing diverse traffic (e.g., voice, data, CBR (constant bit rate), video, . . . ) to a first edge node of the first switching type packet network, B) the first networking edge node, having a first edge traffic adapter for performing predetermined traffic type specific adaption protocols to convert various traffic types to first type packets compatible with the first type packet network, where the packets are also convertible one-to-one to second type packets that are compatible with the second type packet network, C) the first type packet network, operably coupled to the first networking edge node, for transporting first type packets sequentially to at least a first inter-networking node, D) the first inter-networking node, operably coupled to the the first type packet network, for operably coupling the first type packet network to at least the second type packet network and converting the first type packets to second type packets that are compatible with the second type packet network, E) the second type packet network, operably coupled to the first inter-networking node, for transporting second type packets sequentially to at least a second edge node, F) the second edge node, operably coupled to the the second type packet network, converts the second type packets to third type packets that are compatible with a third type packet network, and having a second edge traffic adapter for performing predetermined traffic type specific adaption protocols to convert the third type packets to the original diverse traffic types that are compatible with destination source(s), and G) destination source(s), operably coupled to the second edge node, for receiving the traffic. Clearly, the third type of packets may be selected to be packets of the first type where the third type packet network is a packet network of the first type.

In addition, the system may be described as: a connection-oriented communication network system for ensuring portability of packet traffic from a first switching type network to a second switching type network, comprising: A) traffic source(s), for providing diverse traffic (e.g., voice, data, CBR (constant bit rate), video, . . . ) to a first edge node of the first switching type packet network, B) the first edge node, having a first traffic adapter for performing predetermined traffic type specific adaption protocols to convert various traffic types from the traffic sources to first type packets compatible with the first type packet network, where the packets are also convertible one-to-one to second type packets that are compatible with the second type packet network, then converting the first type packets to second type packets that are compatible with the second type packet network, C) the second type packet network, operably coupled to the first edge node, for transporting second type packets sequentially to at least a second edge node, D) the second edge node, operably coupled to the the second type packet network, converts the second type packets to third type packets that are compatible with a third type packet network, and having a second edge traffic adapter for performing predetermined traffic type specific adaption protocols to convert the third type packets to the original diverse traffic types that are compatible with destination source(s), and E) destination source(s), operably coupled to the second edge node, for receiving the traffic. Again, the third type of packets may be selected to be packets of the first type where the third type packet network is a packet network of the first type.

FIG. 7, numeral 700, illustrates exemplary fields for the fast packet format (701) for the preferred embodiment, which is representative of fast packet formats in general. In the figure, several fields i are shown. The first field is a four bit S field (702) and contains 2 bits to represent up to four levels of packet discard priority information, and 2 bits to represent up to four levels of network congestion information. The packet discard priority bits are set appropriately at the source edge node by the process that adapts the diverse traffic types to the common fast packet format (the so called fast packet adaption layer). The congestion bits are also initialized to the uncongested state at the source edge node, but can be modified appropriately, to indicate increasing levels of network congestion, by intermediate packet switches as the packet traverses the fast packet network. The LCN field (704) is the fast packet logical channel number and is used to differentiate various connections on connecting links between packet switches. The LCN in the preferred embodiment is a 12 bit field and allows 4096 connections per connecting link. The ECC field is an 8 bit error correction code (706) that protects the LCN field. The ECC! can correct for single bit transmission errors in the LCN, and can detect multiple bit errors. The last field is the fast packet payload (708), and contains user's fast packet adapted traffic. Note that the S, LCN, and ECC fields makeup the so called fast packet header, which is always 3 bytes in length, and the payload portion may be of variable size, from 1 to MAX_FPPL bytes. Therefore the fast packet size may vary from 4 bytes to MAX_FPPL+3 bytes.

FIG. 8 illustrates a packet format (800) for an ATM cell (801) as specified by CCITT recommendation I.361. The GFC (802) field is a 4 bit field that is presently for further study at the present time (encoded as 0000). The VPI field (804) is an 8 bit virtual path indentifier. The VCI field (806) is a 16 bit virtual channel indentifier. The VPI and VCI fields are used jointly to differentiate various connections on connecting links between packet (cell relay) switches (up to 16,777,216 connects per connecting link). The PTI field (808) is the payload type indicator field and is used to indicate up to 2 levels of network congestion. The PTI also contains other information not directly relevant to this invention. The PTI field is a 3 bit field, refer to CCITT recommendation I.361 for further information. The single bit CLP (809) field contains up to 2 levels of cell discard priority information. The PTI and CLP bits are initialized by the source edge node by the process that adapts the diverse traffic types to the common ATM cell format (the so called ATM adaption layer). Both the PTI and CLP fields can be modified by intermediate cell relay switching nodes if the cell experiences congestion as it traverses the cell relay network. The HEC field (810) is the header error control field and is an 8 bit field which contains an error detection and correction code that protects the GFC, VPI, VCI, PTI, and CLP fields.

The HEC field can be used to correct a single bit transmission error in these fields, or to detect multiple bit errors. The payload field (812) contains the user's cell adapted traffic. The payload size is fixed, and contains 48 bytes. Note that the OFC, VPI, VCI, PTI, CLP, and HEC fields makeup the so called cell header. The cell header is therefore always 5 bytes in length, the cell payload is always 48 bytes in length, and the total cell size is therefore always 53 bytes.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A packet format adaptation method for ensuring portability of packet traffic from a first switching type network to a second switching type network, comprising the steps of:
   1A) applying predetermined constraints to edge traffic type specific adaption protocols, and
   1B) adaptation of a format of each packet from the first switching type packet system to a format that is portable across the second switching type packet system, wherein the first switching type network is a fast packet (FP) network and the second switching type network is a cell relay network.

2. The packet format adaptation method of claim 1 wherein the adaption and predetermined translation procedure comprises the steps of:
   2A) determining a maximum allowable FP payload length (MAX_FPPL) (applying constraints-Step 1A) in accordance with the function: MAX_FPPL=CRPL-SALF-LCF, where CRPL represents cell relay payload length in network, SALF represents storage area required for a length field to store the fast packet payload length, and LCF represents a length of any additional control fields,
   2B) enforcing a maximum fast packet length constraint (applying constraints-Step 1A) at a fast packet traffic source edge node where the traffic type specific adaption protocol is constrained to limit resulting fast packet payload sizes to MAX_FPPL, and
   2C) encapsulating the fast packets into cells at a first inter-networking node (adaptation of a format-Step 1B).

3. The packet format adaptation method of claim 2 wherein at least one of:
   3A) a format of the fast packets (FPs) includes a FP header and a payload field, and
   3B) a format of the cells includes a cell header, a control field, a length field, and a payload field.

4. The packet format adaptation method of claim 2 wherein encapsulating the fast packets into cells further includes, for each packet, at least one of:
   4A) mapping a logical address of the fast packet to a cell relay logical address,
   4B) mapping a congestion level of the fast packet to a cell relay congestion level,
   4C) mapping a priority level of the fast packet to a cell relay priority level,
   4D) indicating a payload length of the fast packet in the cell, 4E) copying the payload from the fast packet into the cell, and, where necessary, padding the cell to a predetermined length, 4F) where step (4A) is utilized, further including using a predetermined multi-stage table look-up procedure for the mapping of step (4A), 4G) where step (4B) is utilized, further including mapping a cell congestion field in cell header for 2 levels of congestion as a function of a fast packet congestion field in the fast packet header for 2 or more levels of congestion in the fast packet network, 4H) where step (4C) is utilized, further including mapping a cell relay loss priority field (CLP) in the cell header for 2 levels of cell discard priority as a function of a fast packet discard priority field n the fast packet header for 2 or more levels of discard priority in the fast packet network, and 4I) where step (4E) is utilized, padding utilizing multiple code words.

5. The packet format adaption method of claim 2 wherein a first inter-networking node performs translation of the fast packets into cells, thus providing subsequent translating of the cells into fast packets, and a second inter-networking node subsequently performs translation of said cells back into fast packets.

6. The packet format adaption method of claim 5 wherein said subsequent translating the cells into fast packets further includes, for each packet, at least one of:

6) mapping a logical address of the cell to a fast packet logical address, 6B) mapping a congestion level of the cell to a fast packet congestion level, 6C) mapping a priority level of the cell to a fast packet priority level, 4D) reading a payload length indication field in the cell payload to determine; the payload length of the fast packet, 6E) copying the payload from the cell into the fast packet, 6F) where step (6) is utilized, further including using a predetermined, possibly multi-stage, table look-up procedure for the mapping of step (6), 6G) where step (6B) is utilized, further including mapping a fast packet congestion field in fast packet header for 2 or more levels of congestion as a function of a cell relay congestion field in the cell header for 2 levels of congestion in the cell relay network, and 6H) where step (6C) is utilized, further including mapping a fast packet loss priority field in the fast packet header for 2 or more levels of fast packet discard priority as a function of a cell relay discard priority field in the cell header for 2 levels of discard priority in the cell relay network.

7. The packet format adaption method of claim 5 wherein:

7A) said first inter-networking node includes mapping a congestion and loss priority field from the header of the fast packet into a control field in the payload of the cell, and 7B) said second inter:networking node includes mapping fast packet congestion and loss priority field in fast packet header to be a boolean function of said control field in the payload of the cell and cell congestion and loss priority information in cell header.

8. The packet format adaptation method of claim 4 wherein the padding is the code word 01101010, binary, repeated.

9. The packet format adaptation method of claim 2 wherein:

9A) MAX_FPPL is equal to 46 octets,
9B) CRPL=48 octets,
9C) SALF=1 octet, and
9D) LCF=1 octet.

10. The packet format adaptation method of claim 2 wherein:

10A) MAX_FPPL is equal to 47 octets
10B) CRPL=48 octets,
10C) SALF=1 octet, and
10D) LCF=0 octets.

11. A packet format adaptation method for ensuring portability of diverse traffic types from various sources of traffic from a first type packet switching network across a second type packet switching network, where the adaption at an edge of first packet network ensures that one packet is transported in said second packet network for every packet in first network, comprising the steps of:

11A) limiting the payload size of the generated packets at an edge node of said first packet network, 11B) receiving packets from the first type packet switching network at an inter-networking switching node connected to the second type switching network, 11C) translating the packets from the first switching type network into packets of the second type switching network in accordance with a predetermined translation procedure, wherein the first switching type network is a fast packet network and the second type switching network is a cell relay network.

12. The packet format adaptation method of claim 11 wherein the adaption, and predetermined translation procedure comprises the steps of:

12A) determining a maximum allowable FP payload length (MAX_FPPL) (adaption) in accordance with the function: MAX_FPPL=CRPL-SALF-LCF, where CRPL represents cell relay payload length in network, SALF represents storage area required for a length field to store the fast packet payload length, and LCF represents a length of any additional control fields, 12B) enforcing a maximum fast packet length constraint (adaption) at a fast packet traffic source edge node where the traffic type specific adaption protocol is constrained to limit resulting fast packet payload sizes to MAX_FPPL, 12C) encapsulating the fast packets into cells at a first inter-networking node (predetermined translation).

13. The packet format adaptation method of claim 12 wherein at least one of:

13A) a format of the fast packets (FPs) includes a FP header and a payload field, and 13B) a format of the cells includes a cell header, a control field, a length field, and a payload field.

14. The packet format adaptation method of claim 12 wherein translating the fast packets into cells further includes, for each packet, at least one of:

14A) mapping a logical address of the fast packet to a cell relay logical address, 14B) mapping a congestion level of the fast packet to a cell relay congestion level, 14C) mapping a priority level of the fast packet to a cell relay priority level, 14D) indicating a payload length of the fast packet in the cell, 14E) copying the payload from the fast packet into the cell, and, where necessary, padding the cell to a predetermined length, 14F) where step (14A) is utilized, further including using a predetermined, where selected multi-stage, table look-up procedure for the mapping of step (14A), 14G) where step (16B) is utilized, further including mapping a cell congestion field in cell header for 2 levels of congestion as a function of a fast packet congestion field in the fast packet header for 2 or more levels of congestion in the fast packet network, 14H) where step (14C) is utilized, further including mapping a cell relay:loss priority field (CLP) in the cell header for 2 levels of cell discard priority as a function of a fast packet discard priority field in the fast packet header for 2 or more levels of discard priority in the fast packet network, and 14I) where step (14E) is utilized, padding utilizing multiple code words.

15. The packet format adaption method of claim 12 wherein a first inter-networking node performs translation of the fast packets into cells, and a second inter-networking node subsequently performs translation of said cells back into fast packets.

16. The packet format adaption method of claim 15 wherein said subsequent translating the cells into fast packets further includes, for each packet, at least one of:

16A) mapping a logical address of the cell to a fast packet logical address, 16B) mapping a congestion level of the cell to a fast packet congestion level, 26C) mapping a priority level of the cell to a fast packet priority level, 14D) reading a payload length indication field in the cell payload to determine the payload length of the fast packet, 16E) copying the payload from the cell into the fast packet, 16F) where step (16) is utilized, further including using a predetermined, possibly multi-stage, table look-up procedure for the mapping of step (16), 16G) where step (16B) is utilized, further including mapping a fast packet congestion field in fast packet header for 2 or more levels of congestion as a function of a cell relay congestion field in the cell header for 2 levels of congestion in the cell relay network, and 16H) where step (16C) is utilized, further including mapping a fast packet loss priority field in the fast packet header for 2 or more levels of fast packet discard priority as a function of a cell relay discard priority field in the cell header for 2 levels of discard priority in the cell relay network.

17. The packet format adaption method of claim 15 wherein:

17A) said first inter-networking node includes mapping a congestion and loss priority field from the header of the fast packet into a control field in the payload of the cell, and 17B) said second inter-networking node includes mapping fast packet congestion and loss priority field in fast packet header to be a boolean function of said control field in the payload of the cell and cell congestion and loss priority information in cell header.

18. The packet format adaptation method of claim 14 wherein the padding is the code word 01101010, binary, repeated.

19. The packet format adaptation method of claim 12 wherein:

19A) MAX_FPPL is equal to 46 octets

19B) CRPL=48 octets,

19C) SALF=1 octet, and

19D) LCF=1 octet.

20. The packet format adaptation method of claim 12 wherein:

20A) MAX_FPPL is equal to 47 octets

20B) CRPL=48 octets,

20C) SALF=1 octet, and

20D) LCF=0 octets.

21. A connection oriented communication network system for ensuring portability of packet traffic from a first switching type network to a second switching type network, comprising:

21A) traffic sources, for providing diverse traffic to a first networking edge node of the first switching type packet network, 21B) the first networking edge node, having a first edge traffic adapter for performing predetermined traffic type specific adaption protocols to convert various traffic types to first type packets compatible with the first type packet network, where the packets are also convertible one-to-one to second type packets that are compatible with the second type packet network, 21C) the first type packet network, operably coupled to the first networking edge node, for transporting first type packets sequentially to at least a first inter-networking node, 21D) the first inter-networking node, operably coupled to the first type packet network, for operably coupling the first type packet network to at least the second type packet network and converting the first type packets to second type packets that are compatible with the second type packet network, 21E) the second type packet network, operably coupled to the first inter-networking node, for transporting second type packets sequentially to at least a second inter-networking node, 21F) the second inter-networking node, operably coupled to the second type packet network, for operably coupling the second type packet network to at least a third type packet network and converting the second type packets to third type packets that are compatible with the third type packet network, 21G) the third type packet network, operably coupled to the second inter-networking node, for transporting third type packets sequentially to at least a second edge node, 21H) the second edge node, operably coupled to the third type packet network, having a second edge traffic adapter for performing predetermined traffic type specific adaption protocols to convert the third type packets to the original diverse traffic types that are compatible with destination sources, and 21I) destination sources, operably coupled to the second edge node, for receiving the traffic.

22. The connection-oriented communication network system of claim 21 wherein the third type of packets are packets of the first type, and the third type packet network is a packet network of the first type.

23. A connection-oriented communication network system for ensuring portability of packet traffic from a first switching type network to a second switching type network, comprising:
- 23A) traffic sources, for providing diverse traffic to a first edge node of the first switching type packet network,
- 23B) the first edge node, having a first traffic adapter for performing predetermined traffic type specific adaption protocols to convert various traffic types from the traffic sources to first type packets compatible with the first type packet network, where the packets are also convertible one-to-one to second type packets that are compatible with the second type packet network, then converting the first type packets to second type packets that are compatible with the second type packet network,
- 23C) the second type packet network, operably coupled to the first edge node, for transporting second type packets sequentially to at least a first inter-networking node,
- 23D) the first inter-networking node, operably coupled to the second type packet network, for operably coupling the second type packet network to at least a third type packet network and converting the second type packets to third type packets that are compatible with the third type packet network,
- 23E) the third type packet network, operably coupled to the first inter-networking node, for transporting third type packets sequentially to at least a second edge node,
- 23F) the second edge node, operably coupled to the third type packet network, having a second traffic adapter for performing predetermined traffic type specific adaption protocols to convert the third type packets to the original diverse traffic types that are compatible with destination sources, and
- 23G) destination sources, operably coupled to the second edge node, for receiving the traffic.

24. The connection-oriented communication network system of claim 23 wherein the third type of packets are packets of the first type, and the third type packet network is a packet network of the first type.

25. A connection-oriented communication network system for ensuring portability of packet traffic from a first switching type network to a second switching type network, comprising:
- 25A) traffic sources, for providing diverse traffic to a first edge node of the first switching type packet network,
- 25B) the first networking edge node, having a first edge traffic adapter for performing predetermined traffic type specific adaption protocols to convert various traffic types to first type packets compatible with the first type packet network, where the packets are also convertible one-to-one to second type packets that are compatible with the second type packet network,
- 25C) the first type packet network, operably coupled to the first networking edge node, for transporting first type packets sequentially to at least a first inter-networking node,
- 25D) the first inter-networking node, operably coupled to the first type packet network, for operably coupling the first type packet network to at least the second type packet network and converting the first type packets to second type packets that are compatible with the second type packet network,
- 25E) the second type packet network, operably coupled to the first inter-networking node, for transporting second type packets sequentially to at least a second edge node,
- 25F) the second edge node, operably coupled to the second type packet network, converts the second type packets to third type packets that are compatible with a third type packet network, and having a second edge traffic adapter for performing predetermined traffic type specific adaption protocols to convert the third type packets to the original diverse traffic types that are compatible with destination sources, and
- 25G) destination sources, operably coupled to the second edge node, for receiving the traffic.

26. The connection-oriented communication network system of claim 25 wherein the third type of packets are packets of the first type, and the third type packet network is a packet network of the first type.

27. A connection,oriented communication network system for ensuring portability of packet traffic from a first switching type network to a second switching type network, comprising:
- 27A) traffic sources, for providing diverse traffic to a first edge node of the first switching type packet network,
- 27B) the first edge node, having a first traffic adapter for performing predetermined traffic type specific adaption protocols to convert various traffic types from the traffic sources to first type packets compatible with the first type packet network, where the packets are also convertible one-to-one to second type packets that are compatible with the second type packet network, then converting the first type packets to second type packets that are compatible with the second type packet network,
- 27C) the second type packet network, operably coupled to the first edge node, for transporting second type packets sequentially to at least a second edge node,
- 27D) the second edge node, operably coupled to the second type packet network, converts the second type packets to third type packets that are compatible with a third type packet network, and having a second edge traffic adapter for performing predetermined traffic type specific adaption protocols to convert the third type packets to the original diverse traffic types that are compatible with destination sources, and
- 27E) destination sources, operably coupled to the second edge node, for receiving the traffic.

28. The connection-oriented communication network system of claim 27 wherein the third type of packets are packets of the first type, and the third type packet network is a packet network of the first type.

* * * * *